United States Patent
Celi, Jr. et al.

(10) Patent No.: US 8,903,360 B2
(45) Date of Patent: Dec. 2, 2014

(54) MOBILE DEVICE VALIDATION

(75) Inventors: Joseph Celi, Jr., Boca Raton, FL (US); Brett Gavagni, Coconut Creek, FL (US); Mary Ellen Zurko, Groton, MA (US)

(73) Assignee: International Business Machines Corporation, Armonk, NY (US)

(*) Notice: Subject to any disclaimer, the term of this patent is extended or adjusted under 35 U.S.C. 154(b) by 83 days.

(21) Appl. No.: 13/473,739

(22) Filed: May 17, 2012

(65) Prior Publication Data

US 2013/0310002 A1    Nov. 21, 2013

(51) Int. Cl.
H04M 11/04    (2006.01)

(52) U.S. Cl.
USPC ............................ 455/411; 370/328; 704/273

(58) Field of Classification Search
USPC ............................ 455/411; 370/328; 704/273
See application file for complete search history.

(56) References Cited

U.S. PATENT DOCUMENTS

| | | | |
|---|---|---|---|
| 7,707,120 B2 | 4/2010 | Dominguez et al. | |
| 8,014,505 B2* | 9/2011 | Lee et al. | 379/114.2 |
| 2003/0046083 A1* | 3/2003 | Devinney et al. | 704/273 |
| 2007/0055517 A1 | 3/2007 | Spector | |
| 2007/0174080 A1* | 7/2007 | Outwater | 705/1 |
| 2007/0185718 A1* | 8/2007 | Di Mambro et al. | 704/273 |
| 2007/0233483 A1* | 10/2007 | Kuppuswamy et al. | 704/247 |
| 2009/0082062 A1* | 3/2009 | Boyaci et al. | 455/557 |
| 2010/0063895 A1 | 3/2010 | Dominguez et al. | |
| 2011/0122827 A1* | 5/2011 | Bjorsell et al. | 370/328 |
| 2012/0207287 A1* | 8/2012 | Jaiswal et al. | 379/88.02 |
| 2012/0263168 A1* | 10/2012 | Petrack | 370/352 |
| 2012/0293305 A1* | 11/2012 | Shaw et al. | 340/8.1 |

FOREIGN PATENT DOCUMENTS

| CN | 1309802 A | 8/2001 |
|---|---|---|
| CN | 102457845 A | 5/2012 |

OTHER PUBLICATIONS

Mock et al., "Mobile Commerce validation through presence of multiple devices," Motorola, Inc., Jan. 2009, 3 pp.
Boswell et al., "Method of One-Way Authentication Via Passphrase," IBM Technical Disclosure, vol. 38, No. 11, Nov. 1993, 7 pp.
"Wireless Handheld Devices Become Trusted Network Devices, Intel IT implements easy-to-use and secure handheld solutions," Intel Information Technology, Jan. 2006, 12 pp.
International Search Report and Written Opinion, dated Sep. 19, 2013, regarding Application No. PCT/IB2013/053240, 8 pages.

* cited by examiner

*Primary Examiner* — Charles Shedrick
(74) *Attorney, Agent, or Firm* — Yee & Associates, P.C.; Jeffrey S. LaBaw

(57) ABSTRACT

The illustrative embodiments provide a method, apparatus, and computer program product for validating a mobile device. Voice data is received from the mobile device. The voice data comprises a recording of a pass phrase spoken by a user at the mobile device. A determination is made as to whether the mobile device is a valid mobile device using the voice data. An access code to the mobile device is sent in response to a determination that the mobile device is the valid mobile device.

19 Claims, 6 Drawing Sheets

MOBILE DEVICE VALIDATION

BACKGROUND

1. Field

The present disclosure relates generally to an improved data processing system and, more specifically, to accessing a network data processing system by a mobile device.

2. Description of the Related Art

Many different mechanisms are present for managing access to network data processing systems. In particular, access to various services on a network data processing system may be implemented.

Many services request a user identifier and a password to identify a user. The authentication ensures that the user is who the user says that the user is. Based on the authentication, a user may be given access to a network data processing system and also may be given access to various services on the network data processing system. For example, a user may access email, a database, a spreadsheet, a calendar, and other services. Different users may have access to different services or different levels of access for particular services based on the identity of the user.

In some cases, additional security may be provided to ensure that a user is who the user says the user is when authentication occurs. For example, in some network data processing systems, an administrator is able to set up a list of Internet Protocol address ranges from which authentications are allowed. These lists also may be referred to as white lists. A user attempting to authenticate from an Internet Protocol address not on this range of addresses will be blocked from access even if that user is authenticated.

In this manner, security may be present for an instance in which an unauthorized user has obtained a user identification and a password for a valid user. These types of features may add additional levels of security by requiring that the data processing system is in a controlled environment, such as a corporate Internet. The Internet Protocol address range is known for the Internet. In this manner, yet another hurdle may be provided before access to the network data processing system is allowed.

As a result, some network data processing systems, such as mobile devices, may be difficult or impossible to use with this type of security. The Internet Protocol address for a mobile device is often inconsistent and changes more frequently than data processing systems located on a network data processing system of an organization.

SUMMARY

The illustrative embodiments provide a method, apparatus, and computer program product for validating a mobile device. Voice data is received from the mobile device. The voice data comprises a recording of a pass phrase spoken by a user at the mobile device. A determination is made as to whether the mobile device is a valid mobile device using the voice data. An access code to the mobile device is sent in response to a determination that the mobile device is the valid mobile device.

DETAILED DESCRIPTION

Figure 1:
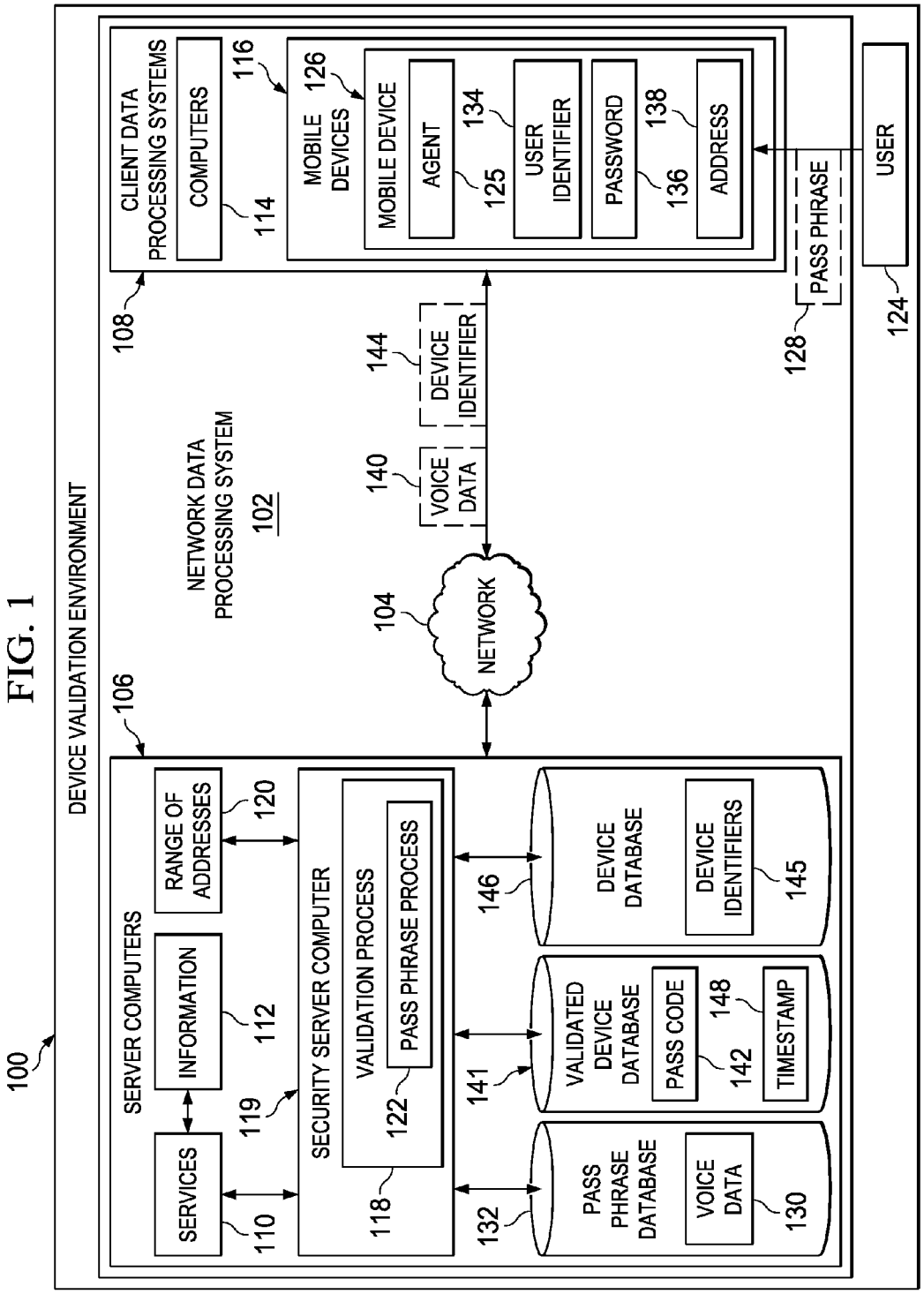
FIG. 1 is an illustration of a device validation environment in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowcharts and/or block diagrams of methods, apparatuses (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

The different illustrative embodiments recognize and take into account that it would be desirable to provide mobile devices an ability to work in network data processing systems that have address range restrictions. The different illustrative embodiments recognize and take into account that the Internet Protocol address of a mobile device is not feasible for use with systems that limit access based on ranges of Internet Protocol addresses.

Thus, the different illustrative embodiments provide another mechanism for identifying a device and determining whether the device is a trusted device that should be allowed access. In one illustrative embodiment, a method and apparatus is present for validating a mobile device. The process receives voice data from a mobile device. The voice data comprises a recording of a phrase spoken by a user at the mobile device. A determination is made as to whether the mobile device is a valid mobile device using the voice data. An access code is sent to the mobile device in response to a determination that the mobile device is a valid mobile device.

With reference now to the figures and, in particular, with reference to FIG. 1, an illustration of a device validation environment is depicted in accordance with an illustrative embodiment. In this illustrative example, device validation environment 100 comprises network data processing system 102. Network data processing system 102 is a network of computers in which illustrative embodiments may be implemented. Network data processing system 102 may be implemented as one or more networks. These networks also may be different types of networks. For example, network data processing system 102 may include an intranet, a local area network, a wide area network, the Internet, or some other suitable type of network.

Network data processing system 102 contains network 104. Network 104 is a medium used to provide communications links between various devices and computers connected together within network data processing system 102. Network 104 may include connections, such as wire, wireless communications links, fiber optic cables, and/or other suitable types of media.

In the depicted example, server computers 106 and client data processing systems 108 connect to network 104. Server computers 106 and client data processing systems 108 are hardware devices that also may include software.

Server computers 106 provide access to services 110. Services 110 may include, for example, without limitation, email, word processing, a spreadsheet, a database, an accounts receivable program, an image editor, and/or other suitable types of services. Services 110 may provide access to information 112. Information 112 may include program code, applications, files, and/or other suitable types of information.

Client data processing systems 108 may include various types of data processing systems. For example, without limitation, client data processing systems 108 may include computers 114 and mobile devices 116. Computers 114 may be desktop computers or other computers, which are typically not moved. Mobile devices 116 may include laptop computers, mobile phones, tablets, and/or other suitable types of mobile devices.

In these illustrative examples, validation process 118 is implemented in security server computer 119 in server computers 106 to validate client data processing systems 108 when client data processing systems 108 attempt to connect to and access network data processing system 102. In particular, validation process 118 may be performed when a client data processing system attempts to connect to network data processing system 102 to access services 110, information 112, or some combination thereof In these illustrative examples, validation process 118 may be located on one or more of server computers 106. In these illustrative examples, validation process 118 may be based on range of addresses 120. Range of addresses 120 may be selected for computers in a particular location or locations, computers within an Internet, or some other suitable selection. In these illustrative examples, use of range of addresses 120 may be suitable for computers 114 but difficult to use with mobile devices 116.

Validation process 118 also may include pass phrase process 122. Pass phrase process 122 may provide additional validation in addition to or in place of using range of addresses 120. Pass phrase process 122 may be useful for validating mobile devices 116 but also may be used with computers 114 or other devices within client data processing systems 108.

In this illustrative example, user 124 of mobile device 126 in mobile devices 116 may register with pass phrase process 122. This registration may be to obtain access to one or more of services 110. User 124 may enroll mobile device 126. This enrollment may include recording pass phrase 128 at mobile device 126 to form voice data 130. Voice data 130 may then be stored in pass phrase database 132.

Thereafter, when user 124 attempts to access a service in services 110 in network data processing system 102 through mobile device 126, user 124 may supply user identifier 134 and password 136 to authenticate user 124. This process may occur using agent 125 on mobile device 126. Agent 125 may be, for example, a browser, an operating system, an application, or some other suitable form of program code.

In these illustrative examples, address 138 of mobile device 126 is also received as part of the authentication process. If address 138 of mobile device 126 is not within range of addresses 120, then pass phrase process 122 indicates that the validation has not occurred.

As a result, pass phrase process 122 may request user 124 to speak pass phrase 128 into mobile device 126. This request may occur through pass phrase process 122 sending a request to agent 125. The request may be a request for voice data and/or an indication that mobile device 126 has not been validated under the process using range of addresses 120.

In this illustrative example, agent 125 in mobile device 126 records pass phrase 128 spoken by user 124 to form voice data 140. Voice data 140 is then sent by agent 125 to pass phrase process 122 in validation process 118 running on security server computer 119.

Pass phrase process 122 determines whether to validate mobile device 126 based on voice data 140. Voice data 140 is compared with voice data 130 in pass phrase database 132. In particular, voice data 140 may be compared with voice data 130 in pass phrase database 132 previously recorded by user 124 at mobile device 126 during registration.

If mobile device 126 is validated, an identification of mobile device 126 may be stored in validated device database 141. Additionally, pass code 142 may be assigned to mobile device 126 and/or user 124. Pass code 142 also may be stored in validated device database 141 in association with mobile device 126. Pass code 142 is returned to mobile device 126. Pass code 142 may be displayed or stored by user 124 for use in accessing network data processing system 102. In particular, pass code 142 may be used to access one or more of services 110, information 112, or a combination of the two. Pass code 142 may be stored and used by mobile device 126 without knowledge of user 124, or user 124 may have access to pass code 142. When user 124 has access to pass code 142, user 124 may enter pass code 142 when accessing services 110, information 112, or other suitable resources.

In these illustrative examples, further controls on use of mobile devices 116 may be made by allowing only particular mobile devices in mobile devices 116 to access network data processing system 102. For example, restrictions may be made based on whether the mobile device is a company-owned mobile device, the type of mobile device, or other suitable constraints. In these illustrative examples, this additional security or restriction may be performed by also receiving device identifier 144 with voice data 130.

Device identifier 144 received from mobile device 126 may be compared with device identifiers 145 in device database 146. This comparison is made to determine whether a match between device identifier 144 is present with a device identifier within device identifiers 145 in device database 146. Device identifiers 145 are identifiers for devices that may be validated. This validation may be for services 110. Further, device identifiers 145 may be associated with particular services in services 110, depending on the particular implementation.

Device identifier 144 may be, for example, without limitation, an international mobile equipment identity (IMEI), a media access code (MAC) address, a processor identifier, a model and serial number, a device fingerprint, or some other suitable type of device identifier. An IMEI number is assigned to the device by the device manufacturer and burned into the read-only memory (ROM) of the mobile device. A media access control address is a unique identifier assigned to network interfaces. A processor identifier is a unique identifier assigned to a processor unit. The model and serial number may be identification information for the particular device. A device fingerprint is information about software, hardware, or a combination of the two on a device. This information may be a summary of settings for hardware, software, or a combination of the two. In other cases, the device fingerprint may also include an identification of software, hardware, or a combination of the two present on a device.

As a result, even though voice data 140 may be correct, if device identifier 144 does not match a device identifier in device identifiers 145 in device database 146, access to network data processing system 102 may be denied. In some cases, access may be provided to network data processing system 102 but to only some of services 110, information 112, or some other combination thereof In some illustrative examples, a requirement may be present to revalidate mobile device 126 after a period of time. In these illustrative examples, this revalidation may be performed using validated device database 141. For example, timestamp 148 may be associated with mobile device 126. Timestamp 148 may be stored in validated device database 141 or on mobile device 126. Subsequent access to network data processing system 102 may occur using pass code 142 as long as timestamp 148 for mobile device 126 has not expired. Once timestamp 148 has expired, user 124 may again be requested to record pass phrase 128 at mobile device 126 as part of a validation process.

The illustration of device validation environment 100 in FIG. 1 is not meant to imply physical or architectural limitations to the manner in which different illustrative embodiments may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although pass phrase process 122 has been described with respect to mobile devices 116, this process also may be applied to other client data processing systems within client data processing systems 108. For example, the process may be applied to computers 114, which may not be mobile like mobile devices 116. As another illustrative example, it may be desirable to require user 124 to re-register mobile device 126 after some period of time. Further, in some illustrative examples, user 124 may send user identifier 134, password 136, and voice data 140 at the same time.

Figure 2:
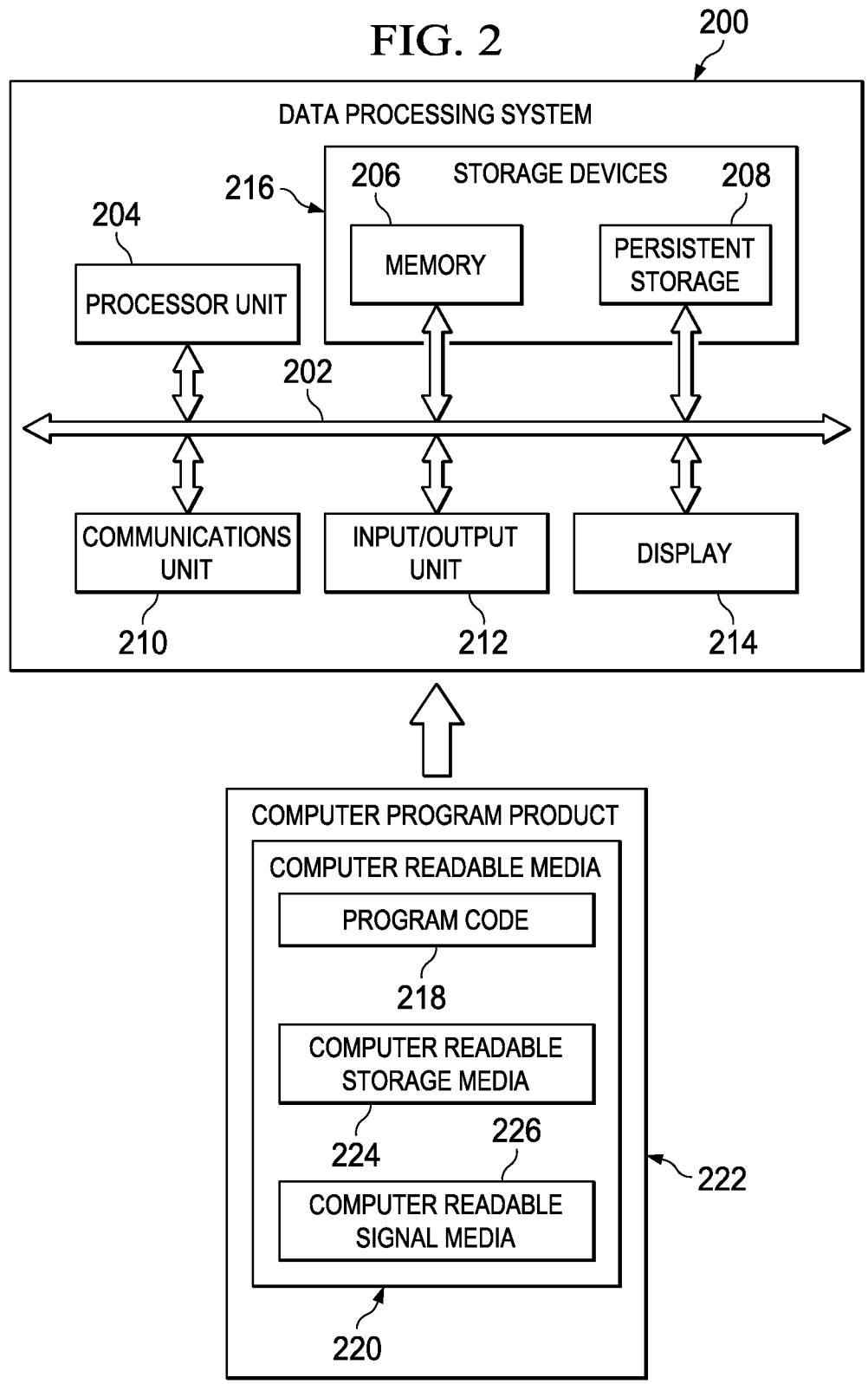
FIG. 2 is an illustration of a data processing system in accordance with an illustrative embodiment.

Turning now to FIG. 2, an illustration of a data processing system is depicted in accordance with an illustrative embodiment. Data processing system 200 may be used to implement a computer in server computers 106, a computer in computers 114, a mobile device in mobile devices 116, or other client data processing systems or devices that may be present within network data processing system 102 in FIG. 1. In this illustrative example, data processing system 200 includes communications framework 202, which provides communications between processor unit 204, memory 206, persistent storage 208, communications unit 210, input/output (I/O) unit 212, and display 214. In these examples, communications framework 202 may be a bus system.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for processing by processor unit 204. The processes of the different embodiments may be performed by processor unit 204 using computer-implemented instructions, which may be located in a memory, such as memory 206.

These instructions are referred to as program code, computer usable program code, or computer readable program code that may be read and processed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208.

Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Figure 3:
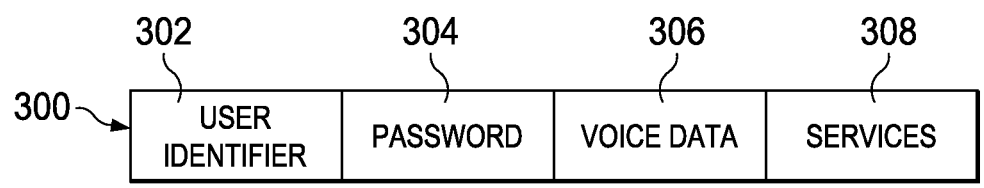
FIG. 3 is an illustration of an entry in a pass phrase database in accordance with an illustrative embodiment.

With reference now to FIG. 3, an illustration of an entry in a pass phrase database is depicted in accordance with an illustrative embodiment. In this illustrative example, entry 300 is an example of an entry from pass phrase database 132 in FIG. 1. In this illustrative example, entry 300 includes user identifier 302, password 304, voice data 306, and services 308. Of course, other information may be present in entry 300, depending on the particular implementation.

User identifier 302 is a user identifier for user 124 in this example. Password 304 is a password normally used by user 124 to authenticate user 124. For example, user identifier 302 may be user identifier 134, and password 304 may be password 136. In this illustrative example, voice data 306 may be voice data 130 in FIG. 1. Voice data 306 is voice data generated by user 124 speaking pass phrase 128 during registration of mobile device 126 in FIG. 1.

Services 308 identify services that may be accessed by user 124. In some illustrative examples, these services may be different from services normally accessed by user 124 when user 124 does not send voice data 306. For example, user 124 may be provided with one set of services from services 110 when user 124 uses a device that is within range of addresses 120. When user 124 uses mobile device 126, which is not within range of addresses 120, a different set of services from services 110 may be provided. These services are identified through services 308 in this illustrative example.

Figure 4:
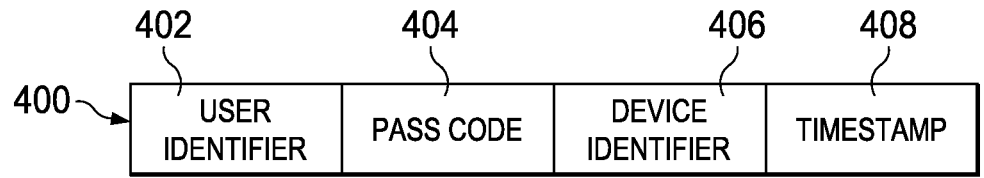
FIG. 4 is an illustration of an entry in a validated device database in accordance with an illustrative embodiment.

Turning now to FIG. 4, an illustration of an entry in a validated device database is depicted in accordance with an illustrative embodiment. In this illustrative example, entry 400 is an example of an entry in validated device database 141 in FIG. 1.

As depicted, entry 400 comprises user identifier 402, pass code 404, device identifier 406 and timestamp 408. User identifier 402 may be, for example, user identifier 134 for user 124 in FIG. 1. Pass code 404 may be, for example, pass code 142 in FIG. 1. Device identifier 406 may be device identifier 144 in FIG. 1. Timestamp 408 may be timestamp 148 in FIG. 1.

In these illustrative examples, entry 400 is an example of an entry that may be created when a device, such as mobile device 126 in FIG. 1, is validated by validation process 118 in FIG. 1. In these illustrative examples, user identifier 402 and pass code 404 may be used to access services 110 from mobile device 126. Pass code 404 is used when mobile device 126 is not within range of addresses 120. Pass code 404 may be used in addition to or in place of the password and user identifier normally employed by user 124.

In these illustrative examples, if further restrictions are desired, device identifier 406 also may be used in entry 400. Device identifier 406 uniquely identifies a particular device, such as mobile device 126. In this manner, if user 124 uses another device that is not within range of addresses 120, access may be denied even though user 124 may have pass code 404. Timestamp 408 may be used to determine when user 124 is required to revalidate mobile device 126 by speaking pass phrase 128. When timestamp 408 expires, pass code 404 is no longer valid in these illustrative examples. Of course, depending upon the particular implementation, timestamp 408 may not be used or may be set to some value that does not expire.

Figure 5:
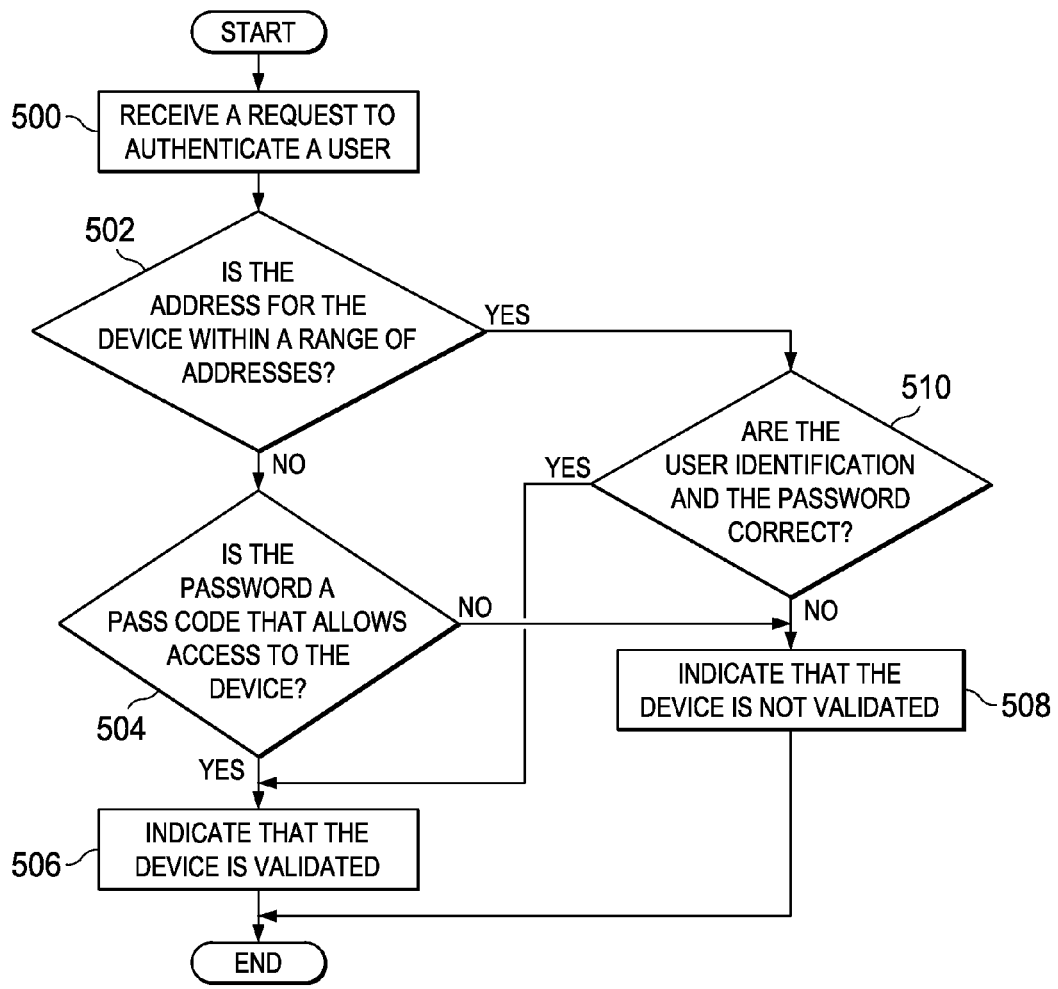
FIG. 5 is a flowchart of a process for validating a device in accordance with an illustrative embodiment.

With reference next to FIG. 5, a flowchart of a process for validating a device is depicted in accordance with an illustrative embodiment. The process illustrated in FIG. 5 may be implemented in device validation environment 100 in FIG. 1. In particular, this process may be implemented using validation process 118 in FIG. 1.

The process receives a request to authenticate a user (step 500). This request may include a user identifier and a password. In these illustrative examples, the password may take the form of password 136 or pass code 142 in FIG. 1. The request also may include an address for the device from which the request is generated.

A determination is made as to whether the address for the device is within a range of addresses (step 502). If the address of the device is not within a range of addresses for which access is allowed, a determination is made as to whether the password is a pass code that allows access to the device (step 504). In step 504, if the device is not within a range of addresses for which access is normally allowed, the password may be a pass code previously sent to user 124, such as pass code 142.

With reference again to step 504, if the password is a pass code that allows access to the device, the process indicates that the device is validated (step 506), with the process terminating thereafter. With this indication, access to one or more services may be enabled. If the password is not a pass code that allows access to the device, the process then indicates that the device is not validated (step 508), with the process terminating thereafter.

With reference again to step 502, if the address of the device is within a range of addresses, the process then determines whether the user identification and the password are correct (step 510). In step 510, the determination is made with respect to the password normally used by user 124 rather than a pass code. For example, the password checked in step 510 may be password 136 instead of pass code 142. If the user identification and password are correct, the process proceeds to step 506. Otherwise, the process proceeds to step 508 as described above.

Figure 6:
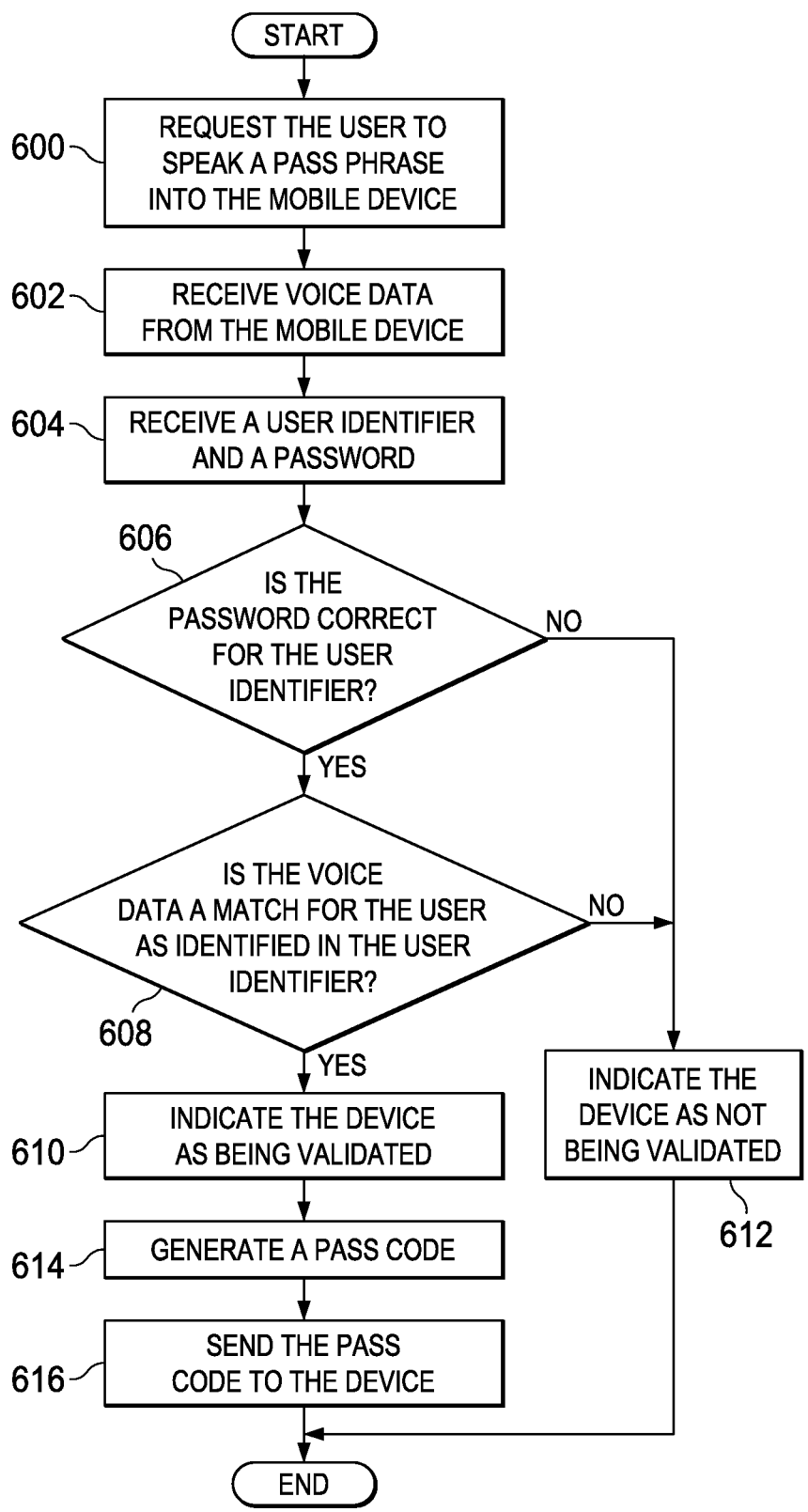
FIG. 6 is a flowchart of a process for validating a device in accordance with an illustrative embodiment.

Turning next to FIG. 6, a flowchart of a process for validating a device is depicted in accordance with an illustrative embodiment. This process may be implemented in device validation environment 100 in FIG. 1. In particular, this process may be implemented in pass phrase process 122 in validation process 118 running on security server computer 119 in FIG. 1. This process may be initiated if a device has an address that is not within a range of addresses and the password is not a pass code that allows access to the device having an address outside of the range of addresses.

The process begins by requesting the user to speak a pass phrase into the mobile device (step 600). The process then receives voice data from the mobile device (step 602). The process also receives a user identifier and a password (step 604). A determination is made as to whether the password is correct for the user identifier (step 606).

If the password for the user identifier is correct, a determination is made as to whether the voice data is a match for the user as identified in the user identifier (step 608). If a match is present, then the device is indicated as being validated (step 610). The process generates a pass code (step 614). The process then sends the pass code to the device (step 616), with the process terminating thereafter.

With reference again to step 608, if a match is not present, the device is indicated as not being validated (step 612), with the process terminating thereafter. With reference again to step 606, if the password for the user identifier is incorrect, the process proceeds to step 612 to indicate that the device is not validated.

Figure 7:
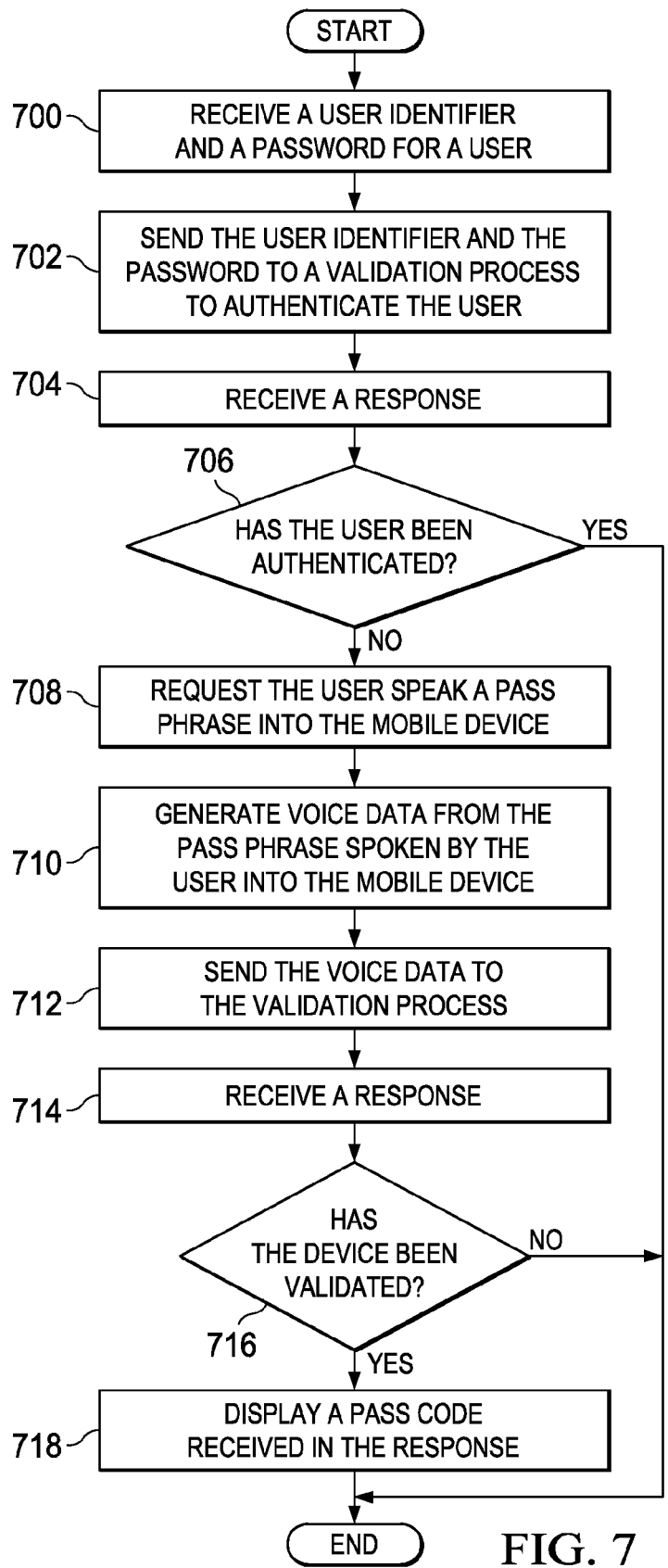
FIG. 7 is a flowchart of a process for validating a device in accordance with an illustrative embodiment.

Turning next to FIG. 7, a flowchart of a process for validating a device is depicted in accordance with an illustrative embodiment. The process illustrated in FIG. 7 may be implemented in device validation environment 100 in FIG. 1. In particular, this process may be implemented in agent 125 running on mobile device 126.

The process begins by receiving a user identifier and a password for a user (step 700). The process then sends the user identifier and the password to a validation process to authenticate the user (step 702). The process then receives a response (step 704). A determination is made as to whether the user has been authenticated (step 706). If the user has not been authenticated, the process requests the user speak a pass phrase into the mobile device (step 708). The process then generates voice data from the pass phrase spoken by the user into the mobile device (step 710).

The process then sends the voice data to the validation process (step 712). A response is received (step 714). A determination is made as to whether the device has been validated (step 716). If the device has been validated, the process displays a pass code received in the response (step 718), with the process terminating thereafter. In some illustrative examples, the pass code may be saved instead of or in addition to being displayed.

In step 716, if the device is not validated, the process terminates. With reference again to step 706, if the user has been authenticated, the process terminates.

Thus, the illustrative embodiments provide a method, apparatus, and computer program product for validating a mobile device. Voice data is received from the mobile device. The voice data comprises a recording of a pass phrase spoken by a user at the mobile device. A determination is made as to whether the mobile device is a valid mobile device using the voice data. An access code to the mobile device is given in response to a determination that the mobile device is a valid mobile device.

In this manner, the different illustrative embodiments may allow devices not on a white list to access a network data processing system. In particular, the devices may be able to access various services normally not allowed when the device is not on a white list. In this manner, another level of security may be implemented to allow devices, such as mobile devices, access to services on a network data processing system.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or combinations of special purpose hardware and computer instructions.

What is claimed is:

1. A method for validating a mobile device, the method comprising:
   receiving an address of the mobile device, a user identifier and a password;
   receiving voice data from the mobile device, wherein the voice data comprises a recording of a pass phrase spoken by a user at the mobile device;
   determining whether the mobile device is a valid mobile device using the voice data; and
   sending an access code to the mobile device in response to a determination that the mobile device is the valid mobile device, wherein determining whether the mobile device is the valid mobile device using the voice data comprises:
   determining whether the mobile device is the valid mobile device using the address of the mobile device; and
   responsive to determining that the mobile device is not the valid mobile device using the address of the mobile device, determining whether the mobile device is the valid mobile device using the voice data, the user identifier, and the password.

2. The method of claim 1 further comprising:
   requesting the user to speak the pass phrase at the mobile device.

3. The method of claim 1, wherein the user identifier, the password, and the voice data are received at substantially a same time.

4. The method of claim 1 further comprising:
   receiving a device identifier from the mobile device, wherein the device identifier uniquely identifies the mobile device; and wherein determining whether the mobile device is the valid mobile device using the voice data comprises:
  determining whether the mobile device is the valid mobile device using the voice data, the user identifier, the password, and the device identifier.

5. The method of claim 4, wherein the device identifier is selected from one of a media access code, a device fingerprint comprising information regarding hardware and software of the mobile device, and a processor identifier.

6. The method of claim 1 further comprising:
  responsive to a validation period expiring for the mobile device, requesting the user to re-validate the mobile device through speaking the pass phrase.

7. The method of claim 6, wherein the validation period is identified using a timestamp assigned to the mobile device when the mobile device was validated.

8. A computer comprising:
  a bus;
  a processor unit connected to the bus;
  a computer readable storage device connected to the bus;
  a device database, a pass phrase database and a validated device database, wherein the device database comprises a plurality of device identifiers, wherein the pass phrase database contains a plurality of pass phrase records that each comprise an associated user identifier, an associated password, associated voice data and a list of allowable services, and wherein the validated device database contains a plurality of validated device records that each comprise an associated user identifier, an associated pass code, an associated device identifier and a timestamp; and
  program code for managing a service, wherein the program code is stored on the computer readable storage device and is configured to be run by the processor unit to receive voice data from a mobile device, wherein the voice data comprises a recording of a pass phrase spoken by a user at the mobile device; determine whether the mobile device is a valid mobile device using the voice data; and send an access code to the mobile device in response to a determination that the mobile device is the valid mobile device.

9. The computer of claim 8, wherein the program code is further configured to be run by the processor unit to receive a user identifier and a password and wherein in being configured to be run by the processor unit to determine whether the mobile device is the valid mobile device using the voice data, the program code is configured to be run by the processor unit to determine whether the mobile device is the valid mobile device using the voice data, the user identifier, and the password.

10. The computer of claim 9, wherein the program code is further configured to be run by the processor unit to receive a device identifier from the mobile device, wherein the device identifier uniquely identifies the mobile device, and wherein in being configured to be run by the processor unit to determine whether the mobile device is the valid mobile device using the voice data, the program code is configured to be run by the processor unit to determine whether the mobile device is the valid mobile device using the voice data and the device identifier.

11. The computer of claim 10, wherein the device identifier is selected from one of a media access code, a device fingerprint comprising information regarding hardware and software of the mobile device, and a processor identifier.

12. The computer of claim 8, wherein the program code is further configured to be run by the processor unit to request the user to re-validate the mobile device through speaking the pass phrase in response to a validation period expiring for the mobile device.

13. A computer program product for managing a mobile device, the computer program product comprising:
  a non-transitory computer readable storage medium comprising program code encoded thereon, wherein the program code comprises;
  first program code for receiving an address of the mobile device, a user identifier and a password;
  second program code for receiving voice data from the mobile device, wherein the voice data comprises a recording of a pass phrase spoken by a user at the mobile device;
  third program code for determining whether the mobile device is a valid mobile device using the voice data; and
  fourth program code for sending an access code to the mobile device in response to a determination that the mobile device is the valid mobile device, wherein the first program code, the second program code, the third program code, and the fourth program code are stored on the computer readable storage medium, wherein the third program code for determining whether the mobile device is the valid mobile device using the voice data comprises:
  program code for determining whether the mobile device is the valid mobile device using the address of the mobile device; and
  program code, responsive to determining that the mobile device is not the valid mobile device using the address of the mobile device, for determining whether the mobile device is the valid mobile device using the voice data, the user identifier, and the password.

14. The computer program product of claim 13 further comprising:
  fifth program code for receiving a device identifier from the mobile device, wherein the device identifier uniquely identifies the mobile device, wherein the fifth program code is stored on the computer readable storage medium; and
  wherein the third program code for determining whether the mobile device is the valid mobile device using the voice data comprises program code for determining whether the mobile device is the valid mobile device using the voice data, the user identifier, the password, and the device identifier.

15. The computer program product of claim 14, wherein the device identifier is selected from one of a media access code, a device fingerprint comprising information regarding hardware and software of the mobile device, and a processor identifier.

16. The computer program product of claim 13 further comprising:
  fifth program code, responsive to a validation period expiring, for requesting the user to re-validate the mobile device through speaking the pass phrase, wherein the fifth program code is stored on the computer readable storage medium.

17. The computer program product of claim 13, wherein the computer readable storage medium is in a data processing system, and the program code is downloaded over a network from a remote data processing system to the computer readable storage medium in the data processing system.

18. The computer program product of claim 17, wherein the computer readable storage medium is a first computer readable storage medium, wherein the first computer readable storage medium is in a server data processing system, and wherein the program code is downloaded over the network to the remote data processing system for use in a second computer readable storage medium in the remote data processing system.

19. A method for validating a mobile device, the method comprising:
- receiving voice data from the mobile device, wherein the voice data comprises a recording of a pass phrase spoken by a user at the mobile device;
- determining whether the mobile device is a valid mobile device using the voice data; and
- sending an access code to the mobile device in response to a determination that the mobile device is the valid mobile device, wherein a first set of services are usable by the mobile device when the mobile device is determined to be the valid mobile device using the address of the mobile device, and a second set of services different than the first set of services are usable by the mobile device when the mobile device is determined to be the valid mobile device using the voice data, the user identifier, and the password.

* * * * *